United States Patent Office 3,340,746
Patented Sept. 12, 1967

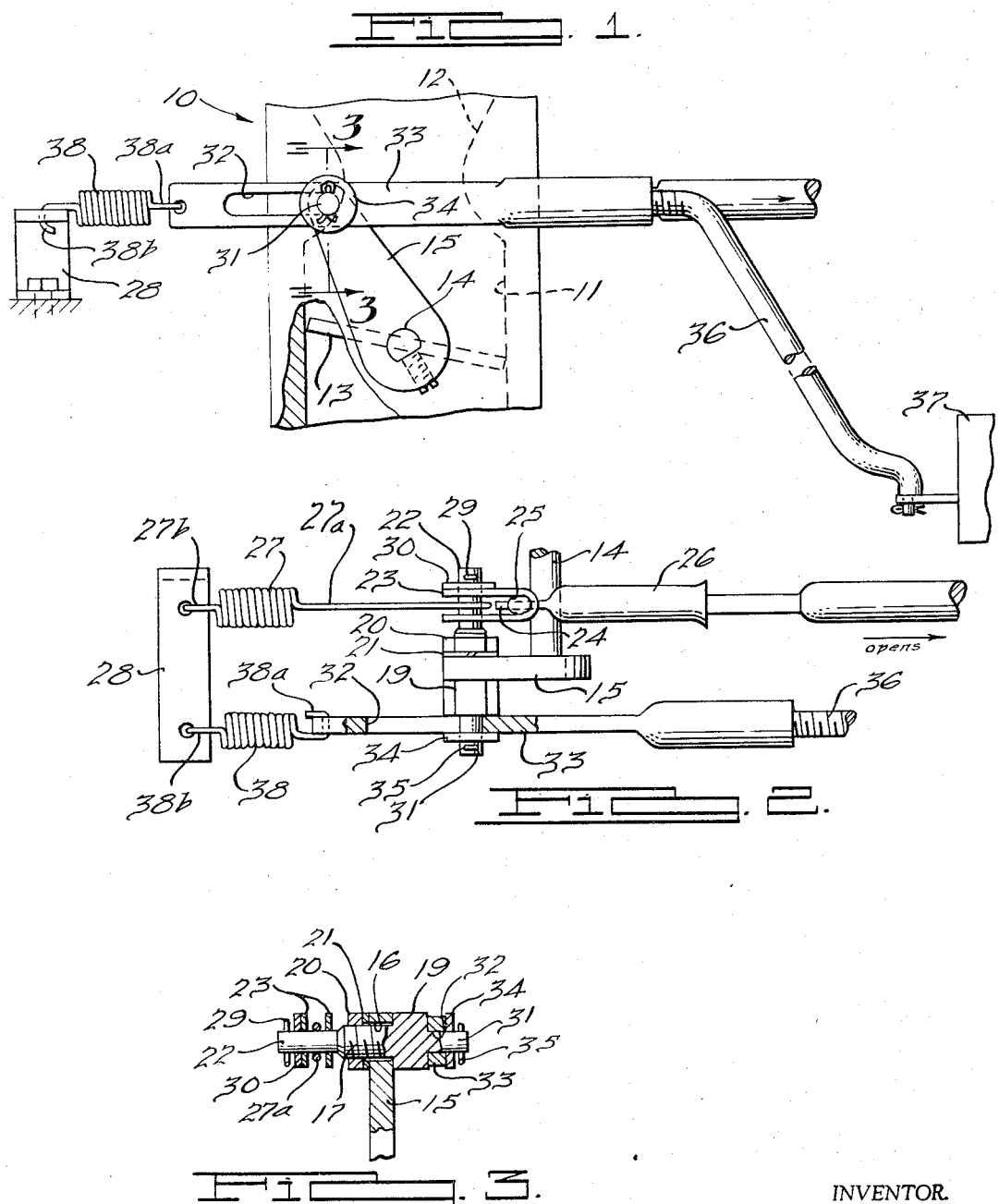

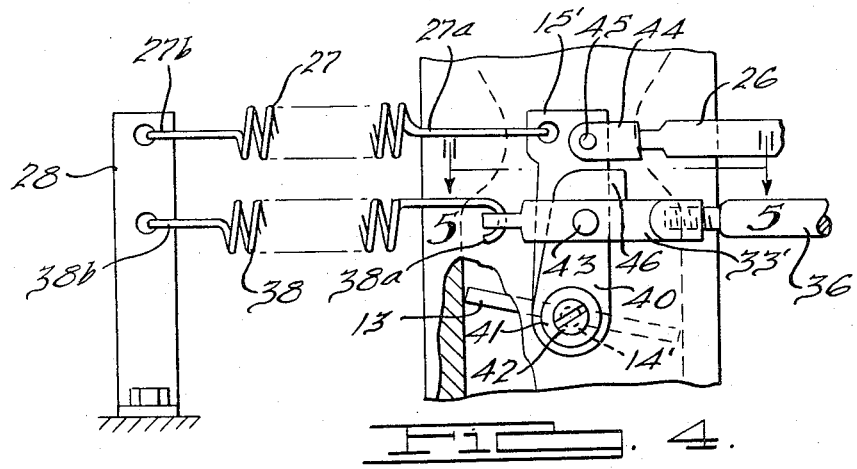

3,340,746
THROTTLE SAFETY RETURN FOR TRANSMISSION FAILURE
Francis W. Hamilton, Southfield, Mich., assignor to Chrysler Corporation, Highland Park, Mich., a corporation of Delaware
Filed Mar. 10, 1965, Ser. No. 438,554
7 Claims. (Cl. 74—472)

ABSTRACT OF THE DISCLOSURE

A crank arm keyed coaxially with the pivotal throttle valve of an automobile engine is connected by lost motion means with an automotive transmission modulating means to drive the latter in one direction upon swinging of the crank arm in the direction to open the throttle and to release the crank arm for swinging to the closed throttle position independently of the modulating means in the event the latter is frozen against movement.

---

This invention relates to improvements in a throttle actuated transmission modulating device for automotive vehicles.

Modern automobiles having an automatic transmission for varying the speed ratio between the engine and torque shaft, which is in driving engagement with the vehicle wheels, customarily provide means for modulating the transmission automatic shift mechanism in accordance with the engine load or wide-open throttle conditions. The greater the throttle opening during acceleration, the longer will the transmission stay in the lower speed ratios.

A serious objection to customary throttle actuated transmission modulating devices is that the transmission occasionally fails to function properly and release the modulating mechanism during acceleration, or the latter which is customarily located near the underside of the vehicle becomes clogged with dirt or frozen mud or slush and fails to release when the throttle is released to decelerate. By reason of the customary interconnection between the throttle and modulating mechanism, failure of the latter to release has also caused failure of the former to release and return to its idle position, occasionally resulting in a run-a-way automobile.

An object of the present invention is to provide an improved throttle actuated transmission modulating mechanism whereby in the event the modulating mechanism fails to release, as for example to its idle condition, the throttle mechanism will return independently to its idle or closed position.

Another object is to provide separate return spring means for returning both the throttle and transmission modulating mechanisms to their idle positions, and to provide an interconnection between the modulating and throttle mechanisms to return the latter to its idle position by means of the return spring for the transmission modulating mechanism in the event the throttle return spring should break.

Another and more specific object of the invention is to provide a throttle controlled transmission modulating and throttle mechanism wherein the pivotal shaft for the customary carburetor throttle valve extends exteriorly of the carburetor induction conduit and is splined at its outer end to one end of a crank arm, so that swinging of the crank arm will pivot the throttle valve to open and close the same. The radially outer swinging end of the crank arm is secured to a transverse bolt or shaft having its axis parallel to the axis of the valve shaft. One end of the transverse bolt is pivotally secured to a throttle linkage operable to swing the crank arm and open the throttle valve upon movement of the throttle linkage in one direction, whereas a throttle return spring yieldingly opposes such movement and urges the throttle valve to its closed or idle position.

The opposite end of the transverse bolt extends pivotally and slidable through a lost motion slot in a transmission modulating rod operably connected with the transmission to modulate the latter. A modulating return spring secured under tension to the modulating rod yieldingly urges the latter to the idle position to maintain said bolt at one end of said slot, such that upon swinging of the crank arm in the direction to open the throttle valve, the bolt will immediately engage the modulating rod at said one end of the slot to actuate said rod and modulate the transmission in accordance with the engine load. By virtue of this construction, operation of the throttle to increase the fuel flow operates the transmission modulating rod, whereas movement of the throttle to the closed or idle position independently of the modulating rod is permitted by means of the bolt sliding freely in the slot toward its other end, in the event the modulating rod fails to return to its idle position.

Another object is to provide such a construction wherein a crank arm is keyed to the throttle shaft to pivot therewith, and a pivotal lever is journaled on the throttle shaft adjacent the crank arm to pivot independently of the latter. The throttle return spring and throttle actuating linkage are connected to the outer swinging end of the crank arm to swing the same in throttle closing and opening directions respectively. The modulating mechanism and the latter's return spring are connected to the outer swinging end of the lever, the spring urging the lever in the direction that the crank arm swings to close the throttle, and the modulating mechanism being actuated by swinging of the lever. Interengaging means are also provided on the lever and crank arm in order to actuate the modulating mechanism upon opening of the throttle valve, which means are releasable from each other to allow return of the crank arm and throttle valve to their closed positions independently of the pivotal lever and transmission modulating linkage in the event of malfunction of the transmission or modulating mechanism.

Another object is to provide such a system wherein the two return springs for the throttle and modulating mechanism are arranged side-by-side, one radially outwardly of the other, in parallelism with each other and in a plane transverse to the pivot axis of the swinging lever and crank arm. One of the latter two members is appreciably longer than the other. In consequence the radially outer ends of these members can be readily secured to the radially arranged ends of their respective return springs to achieve optimum compactness and minimum friction and torque on the throttle shaft.

Other objects of this invention will appear in the following description and appended claims, reference being had to the accompanying drawings forming a part of this specification wherein like reference characters designate corresponding parts in the several views.

FIGURE 1 is a fragmentary schematic view illustrating one embodiment of the invention;

FIGURE 2 is a fragmentary plan view illustration of FIGURE 1;

FIGURE 3 is a fragmentary sectional view taken in the direction of the arrows substantially along the line 3—3 of FIGURE 1;

FIGURE 4 is a view similar to FIGURE 1, illustrating a modification of the invention; and FIGURE 5 is a sectional view taken in the direction of the arrows substantially along the line 5—5 of FIGURE 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the invention is illustrated by way of example in an application with an automotive vehicle wherein a fragmentary portion of the engine 10 is illustrated, including a fuel system which may comprise a conventional carburetor having the fuel induction conduit 11. The conduit 11 contains the usual venturi restriction 12, throttle valve 13 and the usual fuel supply ducts, not shown. Clean combustion supporting air enters the conduit 11 from above through the usual filter. Fuel is added to the air in its downward passage through conduit 11 and the fuel-air mixture is discharged from the lower end of the conduit into a fuel header which distributes the fuel-air mixture to the engine cylinders.

The throttle valve 13 is secured to a pivotal shaft 14 extending through the conduit 11 at a location downstream of the restriction 12 so as to open or close the conduit 11 upon clockwise or counterclockwise pivoting respectively of the shaft 14. The latter extends through the sidewall of the conduit 11 to the exterior of the engine fuel system and is splined to one end of a crank arm 15 to be pivoted upon swinging of the latter.

The outer swinging end of the crank arm 15 is provided with a hole 16, FIGURE 3, through which extends the threaded extension 17 of a bolt having an enlarged hexagonal head 19 abutting the crank arm 15. The enlarged head 19 is securely clamped to the crank arm 15 by the assembly of a nut 20 and washer 21, the nut 20 being screwed tightly on the threaded extension 17 toward crank arm 15 in opposition to the head 19. Leftward of the threaded portion 17 is an integral cylindrical extension 22 of reduced diameter on which is freely pivoted a U-shaped clevis 23.

The left end of a throttle control wire 24 extends through a hole in the U-base of the clevis 23 and is pivotally secured in position by a ball type clamping element 25 crimped tightly around the wire 24 within the clevis 23. The wire 24 extends rightwardly from the clevis 23 through a casing 26 to a foot pedal actuated throttle linkage so as to pull the extension 22 to the right in FIGURE 1 and swing the crank arm 15 clockwise to open throttle 13. The throttle wire 24 is maintained under tension at all times by a throttle closing spring 27 having its right end 27a looped over the extension 22 and its left end 27b secured under tension to a fixed support 28, which may comprise part of the vehicle engine or frame. The clevis 23 is maintained on the extension 22 by means of a washer 30 and a cotter pin 29, which extends diametrically through the left end of extension 22, FIGURE 3.

Extending to the right of the enlarged head 19 is a reduced integral extension 31 which projects freely through a lost motion slot 32 in a transmission modulating rod 33. The rod 33 is maintained on the extension 31 by means of a washer 34 and a cotter pin 35, which extends diametrically through the right end of the extension 31.

As illustrated in FIGURE 1, the right end of the rod 33 is connected by a suitable linkage 36 with an automatic transmission 37 for the vehicle. The rod 33 is normally maintained to the left in FIGURES 1 and 2 by a return spring 38 having its right end 38a secured to the left end of rod 33 and its left end 38b secured under tension to the support 28. The automatic transmission 37 may be conventional and is automatically operative in accordance with engine speed to change the gear ratio between the vehicle engine and its torque shaft which drives the vehicle wheels.

In order to modulate the torque responsiveness of the transmission in accordance with the engine fuel demand or load, the modulating linkage 33–36 operates conjointly with the throttle valve 13. Thus when the throttle valve 13 is slightly open and the engine accelerates to a predetermined speed under comparatively low load, the transmission 37 will shift automatically to a higher gear ratio appropriate for the higher speed. In the event, however, the engine is operating at the same speed as before but the throttle is comparatively wide open, indicating that the engine is under considerable load, the transmission modulating linkage 33–36 will be shifted to the right so as to modulate the operation of the transmission 37 and maintain the latter in a lower gear ratio. The operative relationship between transmission 37 and its modulating linkage 33–36 may be conventional.

By virtue of the lost motion slot 32, when the throttle valve 13 is moved clockwise toward an open position, the bolt extension 22 will engage the rod 33 at the right end of the slot 32 and move the rod 33 rightward as required to its transmission modulating position. Thereafter during deceleration, in the event the transmission modulating linkage 33–36 should stick in its rightward position, as for example by reason of transmission malfunction or in consequence of freezing slush or mud collected around the lower end of the linkage 36, as occasionally happens, the extension 22 is free to ride along the slot 32 toward the latter's leftward end to enable return of the throttle valve 13 to its closed position. Thus, a situation of an inadvertent run-away vehicle is avoided.

The modification illustrated in FIGURES 1–3 is conveniently adaptable for use with certain production fuel systems. FIGURES 4 and 5 show a similar arrangement which allows spring return of the throttle valve to the closed position independently of the transmission modulating mechanism, wherein corresponding parts are numbered the same. This construction is preferred where compactness and low friction are important considerations.

The fuel system including the pivotal shaft 14 and valve 13 may be identical to the system illustrated in FIGURE 1. However, the throttle shaft 14 is provided with a coaxial extension 14' exteriorly of the conduit 11. A crank arm 15' is splined onto extension 14' similarly to the manner that the crank arm 15 is splined onto throttle shaft 14 in FIGURE 1. Pivotally coaxially with the throttle shaft 14 is a swinging throttle modulating lever 40 secured on the extension 14' outwardly of the lever 15' by means of a washer 41 and retaining screw 42. A modulating rod 33', reciprocal in the manner of the rod 33 of FIGURES 1–3, is pivotally secured by a pin 43 to an upper swinging extension of the lever 40. The right end of the rod 33' is secured to the linkage 36 for modulating the transmission 37 in the manner described above. The lever 40 is yieldingly urged counterclockwise by spring 38 having its end 38a secured within the left end of rod 33'.

In FIGURE 5, the left end of throttle wire 24 extends into and is confined within a retainer 44 pivotally secured at 45 to the upper end of lever 15'. The latter is yieldingly urged leftward or counterclockwise to the throttle closing position by spring 27 having its end 27a secured within a hole at the upper end of lever 15'. In order to actuate the modulating linkage 33'–36 upon opening of the throttle 13, an inbent flange 46 integral with the lever 40 extends across the right edge of the crank arm 15'. Thus upon clockwise swinging of crank arm 15' to open throttle valve 13, lever 40 is likewise swung clockwise to move the transmission linkage 36 to the right as above described in regard to FIGURES 1–3. Throttle closing independently of movement of the modulating linkage is readily permitted by crank arm 15' moving counterclockwise or leftward from the flange 46 in the event of transmission malfunction.

In the normal instance in either modification, the spring 38 will urge either rod 33 or 33' leftward in unison with throttle closing movement of the crank arm 15 or 15'.

Accordingly, in the event the throttle return spring 27 should break, the transmission modulating spring 38 will serve as a safety spring and swing the crank arm 15 or 15', as the case may be, counterclockwise to the throttle closed position to prevent a running away situation. This latter operation is accomplished in FIGURE 1 by rod 33 engaging pin 22 at the right end of slot 32, upon leftward movement of rod 33, and is accomplished in FIGURE 4 by flange 46 engaging crank arm 15' upon leftward movement of rod 33'.

I claim:

1. In an automotive vehicle, a fuel system for said vehicle including a fuel-air induction conduit and throttle means, said throttle means including a pivotal valve for opening and closing said conduit, a pivotal crank arm operably coupled with said valve to pivot the latter to open and closed positions, throttle actuating means operably coupled with the swinging end of said crank arm to pivot said valve to said open and closed positions, resilient means yieldingly urging return of said valve to said closed position, an automatic transmission for said vehicle having throttle actuated modulating means shiftable between first and second positions for modulating the automatic operation of said transmission, a stub shaft extending from the swinging end of said crank arm in parallelism with the latter's pivot axis, a lost motion slot in said modulating means, said stub shaft extending into said slot and engaging said modulating means at one end of said slot to shift said modulating means from said first position toward said second position upon swinging of said crank arm in the direction to open said valve and being slidable freely in said slot upon swinging of said crank arm in the opposite direction to close said valve independently of said modulating means.

2. In an automotive vehicle, a fuel system for said vehicle including a fuel-air induction conduit and a throttle valve pivotal within said conduit to open and close the same, a crank arm keyed to said valve to pivot coaxially therewith, throttle actuating means operably coupled with said crank arm to pivot said valve to open and closed positions, resilient means yieldingly urging return of said valve to said closed position, an automatic transmission for said vehicle having throttle actuated modulating means shiftable between first and second positions for modulating the automatic operation of said transmission, driving means on said crank arm for swinging therewith about the axis of said throttle valve upon swinging of said crank arm, a one-way driving connection between said driving means and modulating means for shifting the latter from said first position toward said second position upon swinging of said crank arm in the direction to open said valve and releasable from said driving means to enable swinging of said crank arm independently of said modulating means in the direction to close said valve.

3. In an automotive vehicle, a fuel system for said vehicle including a fuel-air induction conduit and throttle means, said throttle means including a valve pivotal within said conduit to open and close the same, a crank arm keyed to said valve to pivot coaxially therewith, throttle actuating means operably coupled with said crank arm to pivot said valve to open and closed positions, resilient means yieldingly urging return of said valve to said closed position, an automatic transmission for said vehicle having throttle actuated modulating means shiftable between first and second positions for modulating the automatic operation of said transmission, driving means on said crank arm and modulating means engageable to shift said modulating means from said first position toward said second position upon swinging of said crank arm in the direction to open said valve and releasable to enable swinging of said crank arm independently of said modulating means in the direction to close said valve, said driving means comprising a stub shaft extending from the swinging end of said crank arm in parallelism with the latter's pivot axis, a lost motion slot in said modulating means, said stub shaft extending into said slot and engaging said modulating means at one end of said slot to shift said modulating means from said first position toward said second position upon swinging of said crank arm in the direction to open said valve and being slidable freely in said slot upon swinging of said crank arm in the opposite direction to close said valve.

4. In an automotive vehicle, a fuel system for said vehicle including a fuel-air induction conduit and throttle means, said throttle means including a valve pivotal within said conduit to open and close the same, a crank arm keyed to said valve to pivot coaxially therewith, throttle actuating means operably coupled with the swinging end of said crank arm to pivot said valve to open and closed positions, resilient means yieldingly urging return of said valve to said closed position, an automatic transmission for said vehicle having throttle actuated modulating means shiftable between first and second positions for modulating the automatic operation of said transmission, a stub shaft extending from the swinging end of said crank arm in parallelism with the latter's pivot axis, a lost motion slot in said modulating means, said stub shaft extending into said slot and engaging said modulating means at one end of said slot to shift said modulating means from said first position toward said second position upon swinging of said crank arm in the direction to open said valve, said stub shaft being slidable freely in said slot upon swinging of said crank arm in the opposite direction to close said valve, and second resilient means yieldingly urging return of said modulating means to said first position, said modulating means at said one end of said slot engaging said stub shaft to swing said crank arm in said opposite direction to close said valve upon shifting of said modulating means to said first position in the direction from said second position.

5. In an automotive vehicle, a fuel system for said vehicle including a fuel-air induction conduit and throttle means, said throttle means including a valve pivotal within said conduit to open and close the same, a crank arm keyed to said valve to pivot coaxially therewith, throttle actuating means operably coupled with said crank arm to pivot said valve to open and closed positions, resilient means yieldingly urging return of said valve to said closed position, an automatic transmission for said vehicle having throttle actuated modulating means shiftable between first and second positions for modulating the automatic operation of said transmission, second resilient means yieldingly urging return of said modulating means to said first position, driving means on said crank arm and modulating means engageable to shift said modulating means from said first position toward said second position upon swinging of said crank arm in the direction to open said valve, to swing said crank arm to close said valve upon shifting of said modulating means in the direction from said second position to said first position, and releasable to enable swinging of said crank arm independently of said modulating means in the direction to close said valve.

6. In an automotive vehicle, a fuel system for said vehicle including a fuel-air induction conduit and throttle means, said throttle means including a valve pivotal within said conduit to open and close the same, a crank arm keyed to said valve to pivot coaxially therewith, throttle actuating means operably coupled with said crank arm to pivot said valve to open and closed positions, resilient means yieldingly urging return of said valve to said closed position, a pivotal lever mounted adjacent said crank arm to pivot about the pivot axis of said crank arm between first and second positions, second resilient means yieldingly urging return of said lever from said second position to said first position, an automatic transmission for said vehicle having throttle actuated modulating means shiftable to modulate the automatic operation of said transmission and being operably connected with said lever to be shifted thereby, driving means on said crank arm and lever engageable to shift said lever from said first position toward said second position upon swinging of said crank arm in the direction to open said valve and to swing said crank arm to close said valve upon swinging of said lever in the direction from said second position to said first position, said driving means on said crank arm and lever being releasable from each other upon swinging of said crank arm independently of said lever in the direction to close said valve.

7. In an automotive vehicle, a fuel system for said vehicle including a fuel-air induction conduit and throttle means, said throttle means including a pivot shaft extending into said conduit and a valve within said conduit and secured to said shaft to pivot therewith to open and closed positions to open and close said conduit respectively, a crank arm secured to said shaft to pivot therewith, throttle actuating means connected with said crank arm to pivot said valve to said open and closed positions, resilient means yieldingly urging return of said valve to said closed position, a lever journaled on said shaft adjacent said crank arm to swing between first and second positions, second resilient means yieldingly urging return of said lever from said second position to said first position, an automatic transmission for said vehicle having throttle actuated modulating means shiftable to modulate the automatic operation of said transmission and being operably connected with said lever to be shifted thereby, driving means on said crank arm and lever engageable to shift said lever from said first position toward said second position upon swinging of said crank arm in the direction to open said valve and to swing said crank arm to close said valve upon swinging of said lever in the direction from said second position to said first position, said driving means on said crank arm and lever being releasable from each other upon swinging of said crank arm independently of said lever in the direction to close said valve.

References Cited
UNITED STATES PATENTS

| | | | |
|---|---|---|---|
| 2,131,157 | 9/1938 | Almen et al. | 74—472.2 |
| 2,611,281 | 9/1952 | Gray et al. | 74—472.2 |
| 2,977,816 | 4/1961 | Rice | 74—472.2 |

DONLEY J. STOCKING, *Primary Examiner.*

DAVID J. WILLIAMOWSKY, *Examiner.*

H. S. LAYTON, *Assistant Examiner.*